(12) United States Patent
Kolhatkar et al.

(10) Patent No.: US 11,601,079 B2
(45) Date of Patent: Mar. 7, 2023

(54) SYSTEMS AND METHODS FOR CONTROLLING ELECTRICAL POWER SYSTEMS CONNECTED TO A POWER GRID

(71) Applicant: General Electric Company, Schenectady, NY (US)

(72) Inventors: Yashomani Y Kolhatkar, Bangalore (IN); Jayanti Ganesh, Bangalore (IN); Zhuohui Tan, Shanghai (CN); Arvind Kumar Tiwari, Bangalore (IN)

(73) Assignee: General Electric Company, Schenectady, NY (US)

( * ) Notice: Subject to any disclaimer, the term of this patent is extended or adjusted under 35 U.S.C. 154(b) by 794 days.

(21) Appl. No.: 16/523,432

(22) Filed: Jul. 26, 2019

(65) Prior Publication Data

US 2020/0052493 A1 Feb. 13, 2020

(30) Foreign Application Priority Data

Jul. 26, 2018 (CN) .......................... 201810832993.7

(51) Int. Cl.
*H02P 9/00* (2006.01)
*H02P 9/02* (2006.01)

(52) U.S. Cl.
CPC ..................................... *H02P 9/02* (2013.01)

(58) Field of Classification Search
CPC .... G01R 21/003; G01R 21/1331; G05B 6/02; G05F 1/70; H02K 7/183; H02P 9/02; H02J 3/386; H02J 3/381; H02J 3/46; H02J 2300/28; H02J 3/50; Y02E 10/72; Y02E 10/76
See application file for complete search history.

(56) References Cited

U.S. PATENT DOCUMENTS

| 2006/0028025 A1* | 2/2006 | Kikuchi | .................. H02J 3/386 290/44 |
| 2015/0061290 A1 | 3/2015 | Larsen et al. | |
| 2016/0259399 A1 | 9/2016 | Chu et al. | |

FOREIGN PATENT DOCUMENTS

| CN | 105811394 A | * | 7/2016 | |
| CN | 107 834 564 A | | 3/2018 | |
| WO | WO-2014056504 A2 | * | 4/2014 | ............. F03D 7/048 |

OTHER PUBLICATIONS

EP Search Report, dated Jan. 29, 2020.

* cited by examiner

*Primary Examiner* — Julio C. Gonzalez
(74) *Attorney, Agent, or Firm* — Dority & Manning, P.A.

(57) ABSTRACT

The present application relates to a method for controlling a power system connected to a power grid, including: receiving a reactive power instruction and a measured reactive power from a generator; generating a reactive power error signal based on the difference between the reactive power instruction and the measured reactive power; receiving the reactive power error signal; generating a voltage instruction based on reactive power error signal; generating a voltage droop signal based on a reference reactance and a voltage at a point of common coupling; generating a voltage error signal according to at least one of the voltage instruction or the measured terminal voltage of the generator and the voltage droop signal; and producing a reactive current instruction for the converter power path based on the voltage error signal. The present application also discloses a control system for a power system connected to a power grid and a wind farm.

15 Claims, 10 Drawing Sheets

Prior-art

Prior-art

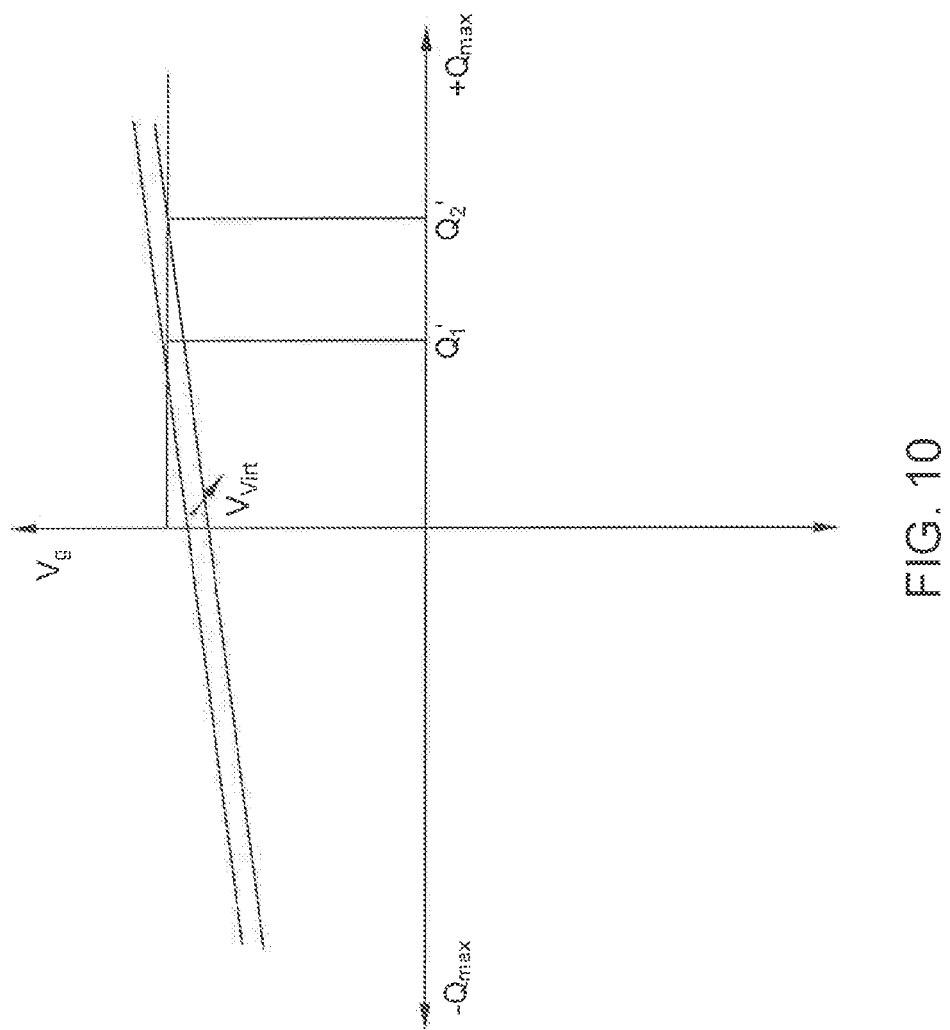

SYSTEMS AND METHODS FOR CONTROLLING ELECTRICAL POWER SYSTEMS CONNECTED TO A POWER GRID

TECHNICAL FIELD

The present application relates to wind turbines and, more particularly, to systems and methods particularly for providing stability voltages to a plurality of wind turbines connected to a power grid.

BACKGROUND

Wind power is considered one of the cleanest, most environmentally friendly energy sources presently available, and wind turbines have gained increased attention based on this reason. A modern wind turbine typically includes a tower, generator, gearbox, engine room, and one or more rotor blades. The rotor blades capture kinetic energy of wind using known airfoil principles. For example, rotor blades typically have the cross-sectional profile of an airfoil such that air flows over the blade producing a pressure difference between the sides during operation. Consequently, a lift force, which is directed from a pressure side towards a suction side, acts on the blade. The lift force generates the torque on the main rotor shaft, which is driven to a generator for producing electricity.

For example, FIGS. 1 and 2 illustrate a conventionally constructed wind turbine 10 and an associated power system suitable for use with the wind turbine 10. As shown, the wind turbine 10 includes an engine room 14 that typically houses a generator 28 (FIG. 2). The engine room 14 is mounted on a tower 12 that extends from a support surface (not shown). The wind turbine 10 also includes a rotor 16 that includes a plurality of rotor blades 20 attached to a rotating hub 18. When the wind impacts the rotor blade 20, the blade 20 converts the kinetic energy of the wind into a mechanical rotational torque that rotatably drives a low speed shaft 22. The low speed shaft 22 is structured to drive a gearbox 24 (if present), which then raises the low rotational speed of the low speed shaft 22 to drive a high speed shaft 26 at an increased rotational speed. The high speed shaft 26 is typically rotatably connected to a generator 28 (e.g., a doubly-fed induction generator, or DFIG) to rotatably drive a generator rotor 30. Thus, the generator rotor 30 can induce a rotating magnetic field. A voltage can be induced within a generator stator 32, which is magnetically coupled to the generator rotor 30. The associated power can be transmitted from the generator stator 32 to a three-winding transformer 34, which is typically connected to a power grid through a grid breaker 36. Therefore, the main transformer 34 raises the voltage amplitude of the power so that the converted power can be further transmitted to the power grid.

Moreover, as shown, the generator 28 is typically electrically coupled to a bi-directional power converter 38 that includes a rotor side converter 40 that is connected to a line side converter 42 through a regulated DC link 44. The rotor side converter 40 converts the AC power supplied from the rotor 30 into the DC power and supplies the DC power to the DC link 44. The Line side converter 42 converts the DC power on DC link 44 into AC output power suitable for the power grid. Thus, the AC power from power converter 38 can be combined with power from the stator 32 to provide multi-phase power (e.g., three-phase power) having a frequency that is substantially maintained at the grid frequency (e.g., 50 Hz/60 Hz).

The shown three-winding transformer 34 typically has (1) a 33 kV medium voltage (MV) primary winding 33 connected to the power grid, (2) a 6 to 13.8 kV MV secondary winding 35 connected to the generator stator 32, and (3) a 690 to 900 volt (V) low voltage (LV) third winding 37 connected to the line side converter 42.

With the increasing success of wind power production in recent years, this form of power has gained a significant market share. As shown in FIG. 3, separate power systems having a plurality of wind turbines 10 can be disposed at predetermined geologic locations and electrically connected together to form a wind farm 46. More specifically, as shown, the wind turbines 10 can be arranged into a plurality of groups 48, each group being connected to a main line 50 through switches 51, 52, 53, respectively. Additionally, as shown, the main line 50 can be electrically coupled to another cluster transformer 54 for further raising the voltage amplitude of the power from the wind turbine group 48 prior to transmitting power to the grid. Since wind energy is not a power source with a constant power output, but with some variations, e.g. variations due to wind speed, operators of distribution networks must take this into account. The three-winding transformer 34 of the wind turbine 10 contributes to the stable operation of the turbine.

However, the three-winding transformer 34 associated with each wind turbine 10 is expensive. In particular, for megawatt (MW) wind turbines, full rated transformer increases the total cost and loss of the wind farm.

Accordingly, it is desirable to provide a control system or control method for a power system to addresses one or more of the above condition.

SUMMARY

Aspects and advantages of the present disclosure will be set forth in part in the following description, or may be obvious from the description, or may be learned through practice of the present disclosure.

In one embodiment of the present application, a method for controlling a power system connected to a power grid is disclosed. The power system has a plurality of power subsystem clusters, each of the power subsystems including a generator and defining a stator power path and a converter power path for supplying power to the power grid, the converter power path having a partial power transformer and a rotor power path. The method comprises: receiving, by a controller, a reactive power instruction and a measured reactive power from the generator; generating a reactive power error signal by the controller based on a difference between the reactive power instruction and the measured reactive power; receiving the reactive power error signal by a reactive power regulator; generating a voltage instruction by the reactive power regulator based on the reactive power error signal; generating a voltage droop signal by a droop controller based on a reference reactance and a voltage at a point of common coupling; generating, by the controller, the voltage error signal according to at least one of the voltage instruction or a measured terminal voltage of the generator and the voltage droop signal; and generating a reactive current instruction for the converter power path by the voltage regulator based on the voltage error signal.

In another embodiment of the present application, a control system for a power system connected to a power grid is disclosed. The power system has a plurality of power subsystem clusters, each of the power subsystems including a generator and defining a stator power path and a converter power path for supplying power to the power grid, the converter power path having a partial power transformer and a rotor power path. The control system comprises: one or more sensors for generating at least one of a measured reactive power or a measured terminal voltage from the generator; a controller configured to receive a reactive power instruction and the measured reactive power from the generator, and generate a reactive power error signal based on a difference between the reactive power instruction and the measured reactive power; a reactive power regulator configured to receive the reactive power error signal and generates a voltage instruction based on the reactive power error signal; a droop controller configured to generate a voltage droop signal based on a reference reactance and a voltage at a point of common coupling; the controller is further configured to generate a voltage error signal according to at least one of the voltage instruction or the measured terminal voltage of the generator and the voltage droop signal; a voltage regulator, configured to generate a reactive current instruction based on the voltage error signal.

In yet another embodiment of the present application, a wind farm is disclosed, comprising: a plurality of wind turbine clusters, a cluster transformer and a plurality of turbine controllers. Wherein each of the wind turbine clusters comprises a plurality of wind turbines, each of the wind turbines having a power converter electrically coupled to a generator having a generator rotor and a generator stator. Each of the wind turbines defines a stator power path and a converter power path for supplying power to the power grid, the converter power path including a partial power transformer. The cluster transformer connects each of the wind turbine groups to the power grid. each of the turbine controllers communicatively coupled to one of the wind turbines, the turbine controller configured to perform one or more operations comprising: receiving a reactive power instruction and a measured reactive power from the generator; generating a reactive power error signal based on a difference between the reactive power instruction and the measured reactive power; receiving the reactive power error signal; generating a voltage instruction based on the reactive power error signal; generating a voltage droop signal based on a reference reactance and a voltage at a point of common coupling; generating a voltage error signal according to at least one of the voltage instruction or a measured terminal voltage of the generator and the voltage droop signal; generating a reactive current instruction for the converter power path based on the voltage error signal.

These and other features, aspects and advantages of the present disclosure will become better understood with reference to the following description and appended claims. The accompanying drawings, which are incorporated into and constitute a part of this description, illustrate the present disclosure and, together with the description, further serve to explain the principles of the present disclosure.

BRIEF DESCRIPTION OF THE DRAWINGS

A complete and feasible disclosure of the present disclosure, including the best mode thereof, is set forth in the description for those of ordinary skill in the art with reference to the accompanying drawings, in which:

FIG. 10 illustrates a relationship diagram of the voltage vs. power for two wind turbines having different reactive power set points in accordance with the present disclosure.

DETAILED DESCRIPTION

Figure 1:
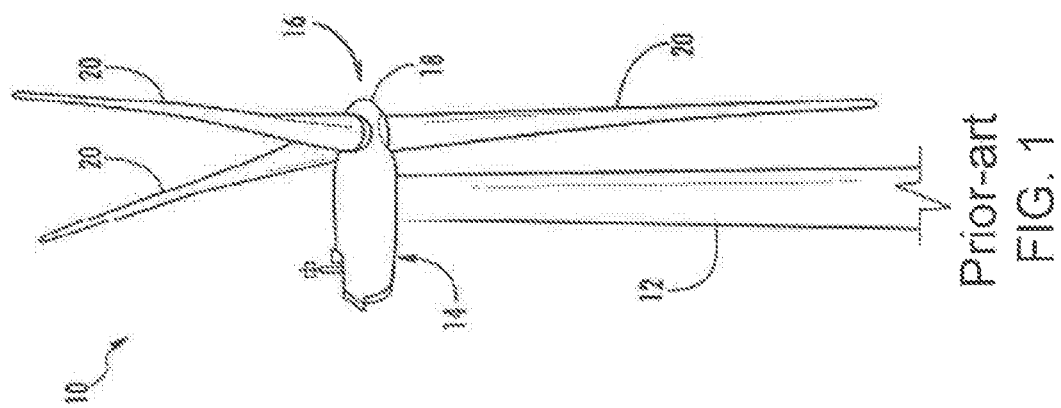
FIG. 1 illustrates a perspective view of a portion of one embodiment of a wind turbine in accordance with the conventional structure.

Reference now will be made in detail to embodiments of the invention. One or more examples of the present disclosure are illustrated in the drawings. Each example is provided by way of explanation of the invention rather than the limitation of the invention. In fact, it will be apparent to those skilled in the art that various modifications and variations can be made in the present disclosure without departing from the scope or spirit of the present disclosure. For instance, features illustrated or described as a part of one embodiment can be used with another embodiment to yield a still further embodiment. Thus, it is intended that the present disclosure covers such modifications and variations and their equivalents as within the scope of the appended claims.

Generally, the present disclosure relates to a method for controlling a power system connected to a power grid. The method includes receiving a reactive power instruction and a measured reactive power from a generator, and generating a reactive power error signal based on a difference between the reactive power instruction and the measured reactive power. Additionally, the method includes receiving a reactive power error signal and generating a voltage instruction based on the reactive power error signal. The method also includes generating a voltage droop signal based on a reference reactance and a voltage at a point of common coupling. As such, the method further includes generating a voltage error signal according to at least one of the voltage instruction or the measured terminal voltage of the generator and the voltage droop signal, and generating a reactive current instruction of the converter power path based on the voltage error signal.

The present disclosure provides many advantages that are not present in the prior art. For example, the present disclosure reduces reactive power oscillations or the transient voltage instability between wind turbines due to low impedance between each turbine generator. In some embodiments, the power system does not include a three-winding transformer or a pedestal-mounted transformer (PMT).

Figure 4:
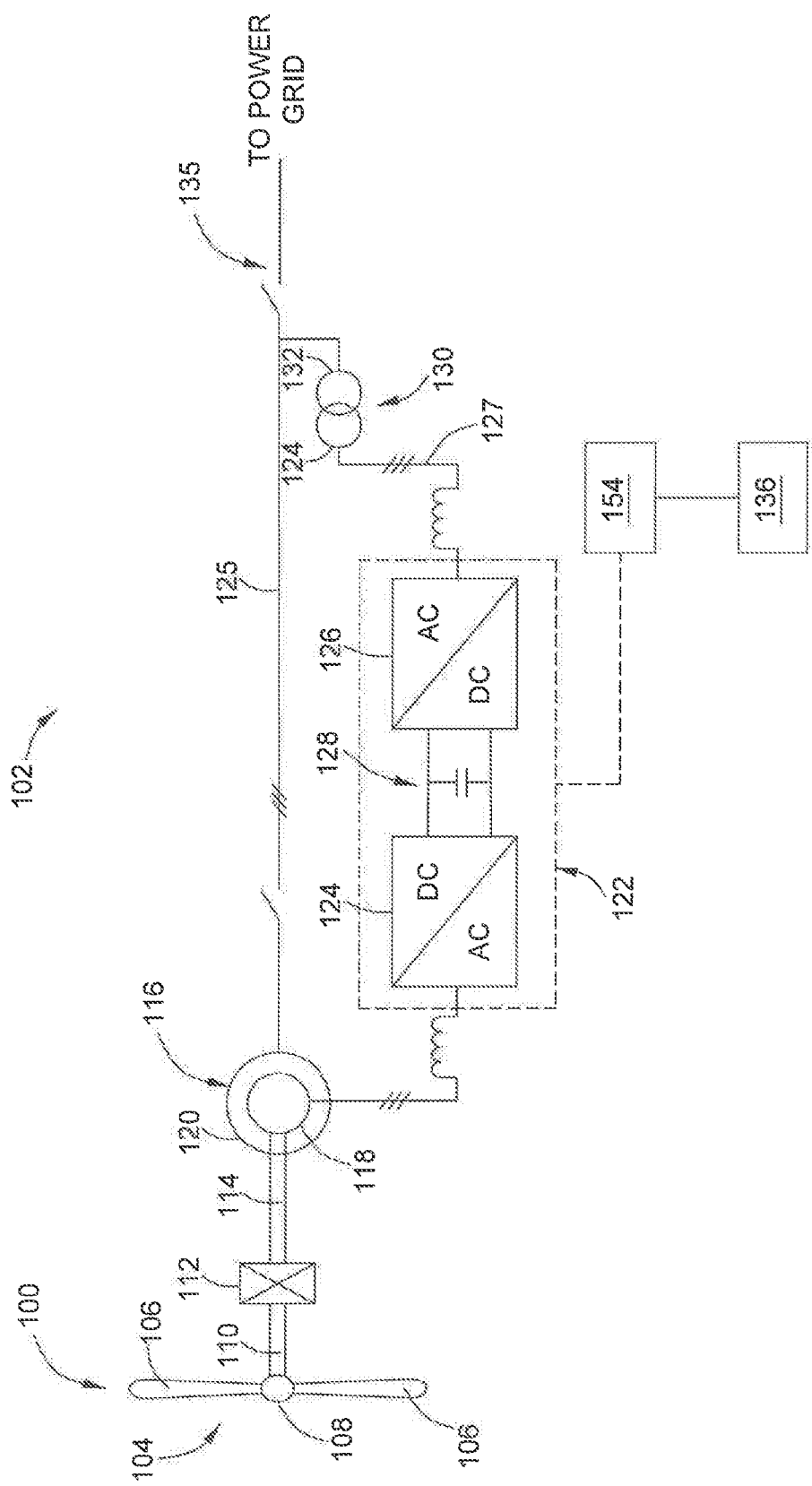
FIG. 4 illustrates a schematic diagram of one embodiment of a power system for a wind turbine in accordance with the present disclosure.

Referring now to FIG. 4, a schematic diagram of one embodiment of a power subsystem 102 in accordance with the present disclosure is shown. It should be understood that the term "subsystem" is used herein to distinguish various power systems (e.g., as shown in FIG. 4) and the entire power system 105 of FIG. 5. However, one of Ordinary Skill in the Art will recognize that the power subsystem 102 of FIG. 4 can also be referred to in more general terms, for example only a system (rather than a subsystem). Therefore, these terms may be used interchangeably and are not meant to be limiting.

Moreover, as shown, the power subsystem 102 may correspond to a wind turbine power system 100. More specifically, as shown, the wind turbine power system 100 includes a rotor 104 that includes a plurality of rotor blades 106 attached to a rotating hub. When the wind impacts the rotor blade 106, the blade 106 converts the wind energy into a mechanical rotational torque that rotatably drives a low speed shaft 110. The low speed shaft 110 is configured to drive a gearbox 112, and then raises the low speed of a low speed shaft 110 to drive a high speed shaft 114 to rotate at an increased speed. The high speed shaft 114 is typically rotatably coupled to a doubly-fed induction generator 116 (hereinafter referred to as DFIG 116) to rotatably drive a generator rotor 118. As such, the generator rotor can induce a rotating magnetic field. In one embodiment, for example, the generator 116 is configured to convert the rotational mechanical energy into a sinusoidal three-phase alternating current (AC) power signal in the generator stator 120. Thus, as shown, the associated power can be transmitted directly from the generator stator 120 to the power grid.

Figure 2:
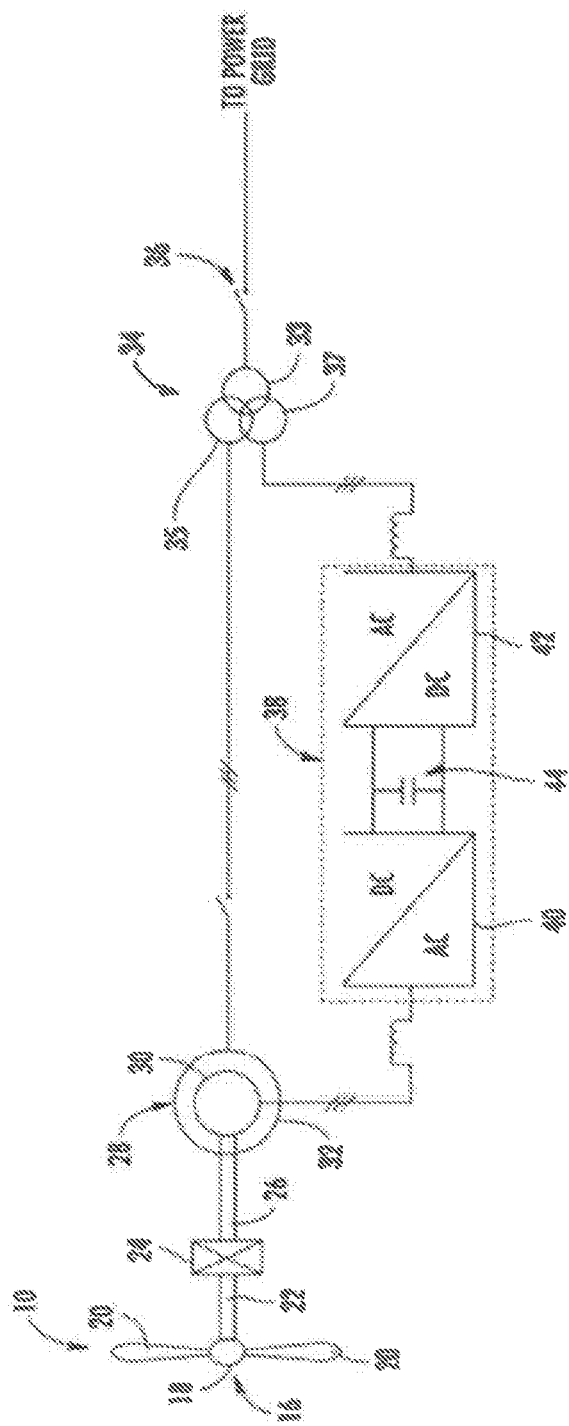
FIG. 2 illustrates a schematic diagram of a conventional power system suitable for the wind turbine shown in FIG. 1.
Figure 3:
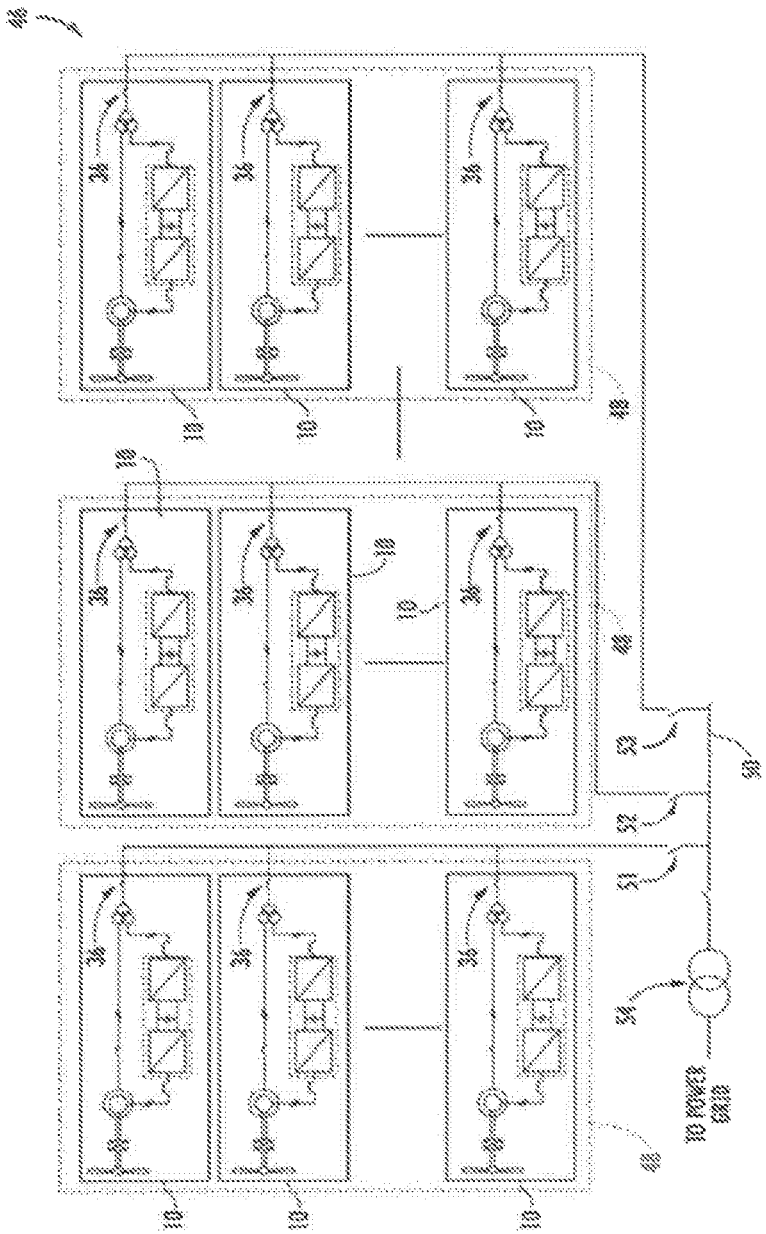
FIG. 3 illustrates a schematic diagram of one embodiment of a conventional wind farm in accordance with conventional structure, particularly illustrates a plurality of wind turbine power systems as shown in FIG. 1 connecting to a single substation transformer.

Additionally, as shown, the generator 116 is electrically coupled to a bi-directional power converter 122 including a rotor-side converter 124 connected to a line side converter 126 through a regulated DC link 128. Therefore, the rotor side converter 124 converts the AC power supplied by the generator rotor 118 into the DC power and supplies the DC power to the DC link 128. The Line side converter 126 converts the DC power on the link 128 into the AC output power suitable for the power grid. More specifically, as shown, the AC power from the power converter 122 may be combined with power from the generator stator 120 via a converter power path 127 and a stator power path 125, respectively. For example, as shown, and in contrast to those conventional systems as shown in FIGS. 1-3, the converter power path 127 may include a partial power transformer 130 for raising the voltage amplitude of power from the power converter 122, so that the converted power can be further transmitted to the power grid. Thus, as shown, the system 102 shown in FIG. 4 does not include the conventional three-winding transformer described above. To some extent, in the illustrated embodiment, a partial power transformer 130 may correspond to a two-winding transformer having a primary winding 132 connected to the power grid and a secondary winding 134 connected to the rotor side converter 124. In some embodiments, the dual winding transformer is a three phase transformer. Since there is no leakage impedance of the transformer in the stator power path, the rotor side converter 124 is modified to achieve a smooth response on different wind turbine power systems 100.

Figure 6:
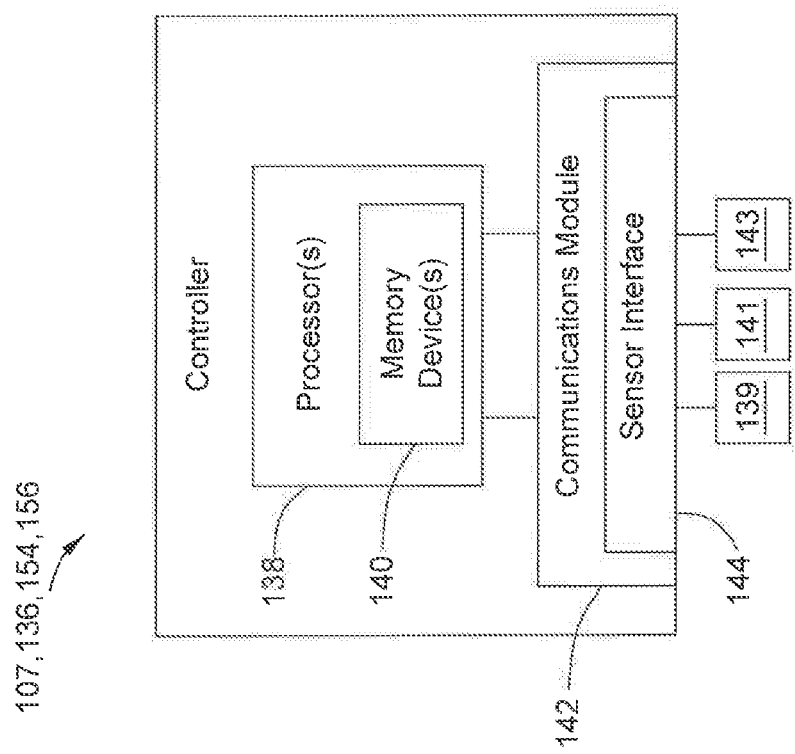
FIG. 6 illustrates a block diagram of one embodiment of a wind turbine controller in accordance with the present disclosure.

Moreover, the power system 100 can include one or more controllers. For example, as shown in FIG. 6, the system 100 can include a system level controller (e.g. the farm level controller 107), one or more cluster level controllers 156, and/or one or more subsystem level controllers (e.g. the turbine level controller 136). As such, the various controllers described herein are configured to control any of the components of the wind farm 105, the wind turbine group 137, and/or the individual wind turbine power system 100, and/or implement method steps as described herein.

For example, as specifically shown in FIG. 6 is a block diagram of one embodiment of a controller as described herein. As shown, the controller can include one or more processors 138 and associated memory devices 140 that are configured to execute various computer-implemented functions (e.g. as disclosed herein, executing related operations such as methods, steps, calculations etc., and storing related data). Additionally, the controller may also include a communication module 142 to facilitate communication between the controller and various components of the wind farm 105, for example, any components in FIGS. 4 and 5. Moreover, the communication module 142 may include a sensor interface 144 (e.g., one or more analog-to-digital converters) to allow signals transmitted from one or more sensors 139, 141, 143 to be converted into signals that can be understood and processed by the processor 138. It should be understood that the sensors 139, 141, 143 can be communicatively coupled to the communication module 142 using any suitable devices. For example, as shown in FIG. 6, the sensors 139, 141, 143 can be coupled to the sensor interface 144 by a wired connection. However, in other embodiments, the sensors 139, 141, 143 can be coupled to the sensor interface 144 via a wireless connection, for example, using any suitable wireless communication protocol known in the art. As such, the processor 138 can be configured to receive one or more signals from the sensors 139, 141, 143.

As used herein, the term "processor" refers not only to an integrated circuit as indicated in the art as included in a computer, but also to a controller, a microcontroller, a microcomputer, a programmable logic controller (PLC), an application specific integrated circuit and other programmable circuits. The processor 138 is also configured to calculate advanced control algorithms and to communicate various Ethernet or serial based protocols (Modbus, OPC, CAN, etc.). Additionally, one or more memory devices 140 may generally comprise one or more memory elements including, but not limited to, computer readable media (e.g., random access memory (RAM)), computer readable non-volatile media (e.g., flash memory), floppy disk, compact disk read only memory (CD-ROM), magneto-optical disk (MOD), digital versatile disk (DVD), and/or other suitable memory elements. This or these memory device(s) 140 may be generally configured to store suitable computer readable instructions that, when implemented by one or more processors 138, configure the controller to perform various functions as described herein.

In operation, alternating current (AC) power generated at the generator stator 120 by rotation of the rotor 104 is supplied to the power grid via dual path, i.e., via the stator power path 125 and the converter power path 127. More specifically, the rotor side converter 124 converts the AC power supplied from the generator rotor 118 into the DC power and supplies the DC power to the DC link 128. The switching elements (eg, IGBTs) used in the bridge circuit of the rotor side converter 124 can be modulated to convert the AC power provided from the generator rotor 118 to the DC power suitable for the DC link 124. The line side converter 126 converts the DC power on the DC link 128 into AC output power suitable for the power grid. In particular, switching elements (e.g., IGBTs) used in the bridge circuit of line side converter 126 can be modulated to convert the DC power on the DC link 128 to the AC power. Thus, the AC power from the power converter 122 can be combined with power from the generator stator 120 to provide multi-phase power having a frequency that is substantially maintained at the bus frequency. It should be understood that the rotor side converter 124 and the line side converter 126 can have any configuration to facilitate operation of any switching devices of the power system 200 as described herein.

Moreover, the power converter 122 can be in electronic data communication with a turbine controller 136 and/or a separate or integral conversion controller 154 to control operation of the rotor side converter 124 and the line side converter 126. For example, during operation, the controller 136 can be configured to receive one or more voltage and/or current measurement signals from a first set of voltage and current sensors 139, 141, 143. Accordingly, the controller 136 can be configured to monitor and control at least some of the operational variables associated with wind turbine power system 100 by the sensors 139, 141, 143. In the shown embodiment, the sensors 139, 141, 143 can be electrically coupled to any portion of the power subsystem 102 to facilitate operation of the power subsystem 102 as described herein.

It should also be understood that any number or type of voltage and/or current sensors can be employed within the wind turbine power system 100 and at any location. For example, the sensor can be a current transformer, a shunt sensor, a Rogowski coil, a Hall effect current sensor, a micro inertial measurement unit (MIMU) or the like, and/or any other suitable voltage or current sensor known at this stage or later developed. Accordingly, the conversion controller 154 is configured to receive one or more voltage and/or current feedback signals from the sensors 139, 141, 143. More specifically, in certain embodiments, the current or voltage feedback signal can include at least one line feedback signal, a line side converter feedback signal, a rotor side converter feedback signal, or a stator feedback signal.

Figure 5:
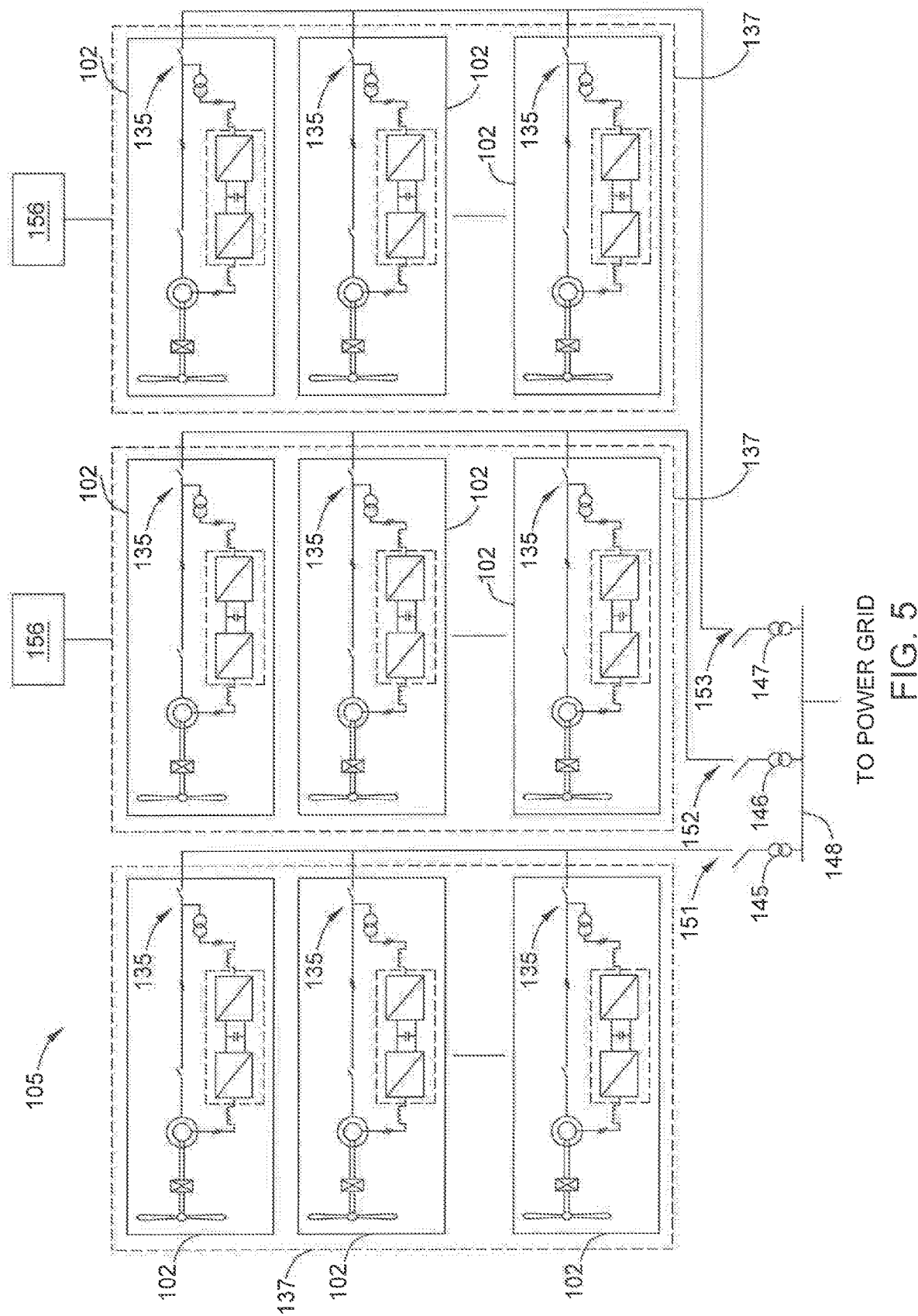
FIG. 5 illustrates a schematic diagram of one embodiment of a wind farm in accordance with the present disclosure, particularly illustrates a plurality of wind turbine groups, each of which connected to a power grid by a cluster transformer.

As shown in FIG. 5, various power systems (e.g., power subsystem 102 shown in FIG. 4) may be arranged in at least two clusters 137 to form a power system 105. More specifically, as shown, the wind turbine power system 100 can be arranged. Multiple clusters 137 are accessed to form a wind farm. Thus, as shown, each cluster 137 can be connected to separate transformers 145, 146, 147 via switches 150, 151, 152 respectively, for raising the voltage amplitude of the power from each cluster 137 such that the transformed power can be further transmitted to the power grid. Additionally, as shown, the transformers 145, 146, 147 are connected to a main line 148, which combines the voltage from each cluster 137 before sending power to the power grid. Moreover, as described above, each cluster 137 can be communicatively coupled to the cluster level controller 156.

Figure 7:
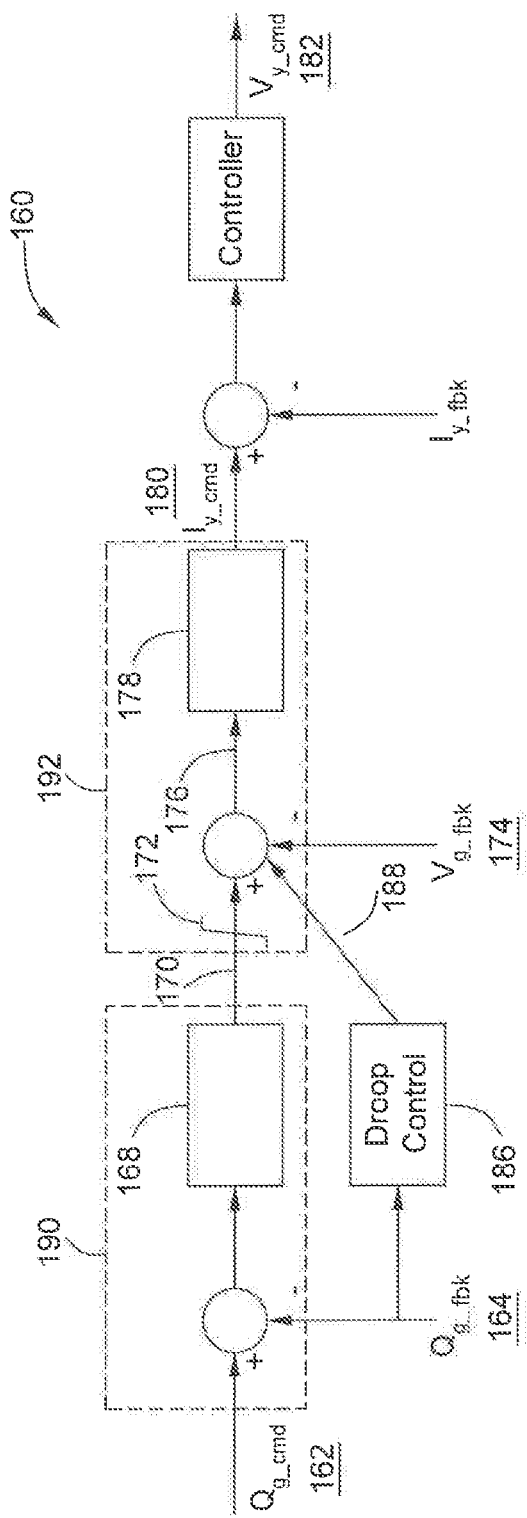
FIG. 7 illustrates a schematic diagram of one embodiment of a control system in accordance with the present disclosure.

However, due to the lack of the impedance provided by the secondary windings 35 in the main three-winding transformers 34 of conventional systems, it becomes difficult for each wind turbine to regulate its terminal voltage. More specifically, such systems (systems as shown in FIG. 4) are known to experience reactive power oscillations. Thus, FIG. 7 illustrates a schematic diagram of one embodiment of a control system 160 in accordance with the present disclosure that addresses the problems associated with that resulting from the removal of the main transformer 34 shown in FIG. 2.

As shown, a control system 160 includes two loops: a voltage regulator loop 192 and a reactive power (Q) regulator loop 190. The voltage regulator loop 192 operates relatively faster (e.g., 20 rad/sec) compared to the Q regulator loop 190 (e.g., a closed loop time constant greater than 1 second). Moreover, a reactive power (VAR) regulator 168 regulates the set point of the voltage regulator loop 192. Conceptually, the control system of FIG. 7 provides terminal voltage control of the wind turbine generator by regulating the voltage to a reference point set by the controller. The reactive power is regulated for a longer period of time (e.g., a few seconds) while the terminal voltage of the wind turbine generator is regulated for a shorter period of time (e.g., less than a few seconds) to mitigate the effects of rapid grid transients.

More specifically, as shown, a reactive power instruction 162 ($Q_{g\_cmd}$) of the generator 116, which corresponds to a instruction indicating the target reactive power generated by the generator 116, is compared to a signal indicating the measured reactive power ($Q_{g\_fbk}$). The resulting reactive power error signal 166 represents the difference between the measured reactive power 164 and the indicated reactive power 162. The reactive power error signal 166 is an input signal of the reactive power regulator 168, which produces a voltage instruction 170 ($V_{g\_cmd}$) for indicating the reactive power provided by the generator 116.

In some embodiments, the voltage instruction 170 is limited to a predetermined range, for example, by a limiter 172, and then compared to the signal of a terminal voltage 174 ($V_{g\_fbk}$) measured by the generator 116. Moreover, as shown, the control system 160 also includes a droop controller 186 for generating a voltage droop signal 188 ($K_{droop}$) based on a reference reactance and a voltage at a point of common coupling. As such, the droop controller 186 allows the wind turbines to operate in parallel without creating mutual control effect and power oscillations there between by providing droop control for each turbine in the wind farm.

In some embodiments, this limitation is determined by some fixed parameter discussion, however, this limitation may also be provided, for example, by a lookup table or dynamically variable parameters provided by a processor/state machine executing a control algorithm. This dynamic variable limit can be obtained based on the current rating of the generator and the synchronized actual power output.

With further reference to FIG. 7, a voltage error signal 176, which is the input signal to a voltage regulator 178, is generated according to at least one of the voltage instruction 170 or the measured terminal voltage 174 of the generator and the voltage droop signal 188.

Subsequently, voltage regulator 178 generates a reactive current instruction 180 ($I_{y\_cmd}$) for the converter power path. In some embodiments, the voltage regulator 178 is a proportional-integral (PI) controller with a closed-loop time constant of approximately 50 milliseconds. Other types of controllers can also be used, for example proportional differential (PD) controllers, proportional integral differential (PID) controllers, or state space controllers etc. For the voltage regulator 178, other time constants (e.g., 1 second, 20 milliseconds, 75 milliseconds, 45 milliseconds) may be used provided that the time constant of the time voltage regulator 178 is less than the time constant of the reactive power regulator 168. Typically, the reactive current instruction 180 has two components, i.e. an active power component and a reactive power component. For example, the reactive current instruction 180 generated as described in FIG. 7 is a reactive power component instruction. The active power component can be generated in any manner known in the art. In some embodiments, the control system 160 also receives the reactive current instruction 180 and generates a reactive voltage instruction 182 for the line side converter 126 and the rotor side converter 124.

Figure 8:
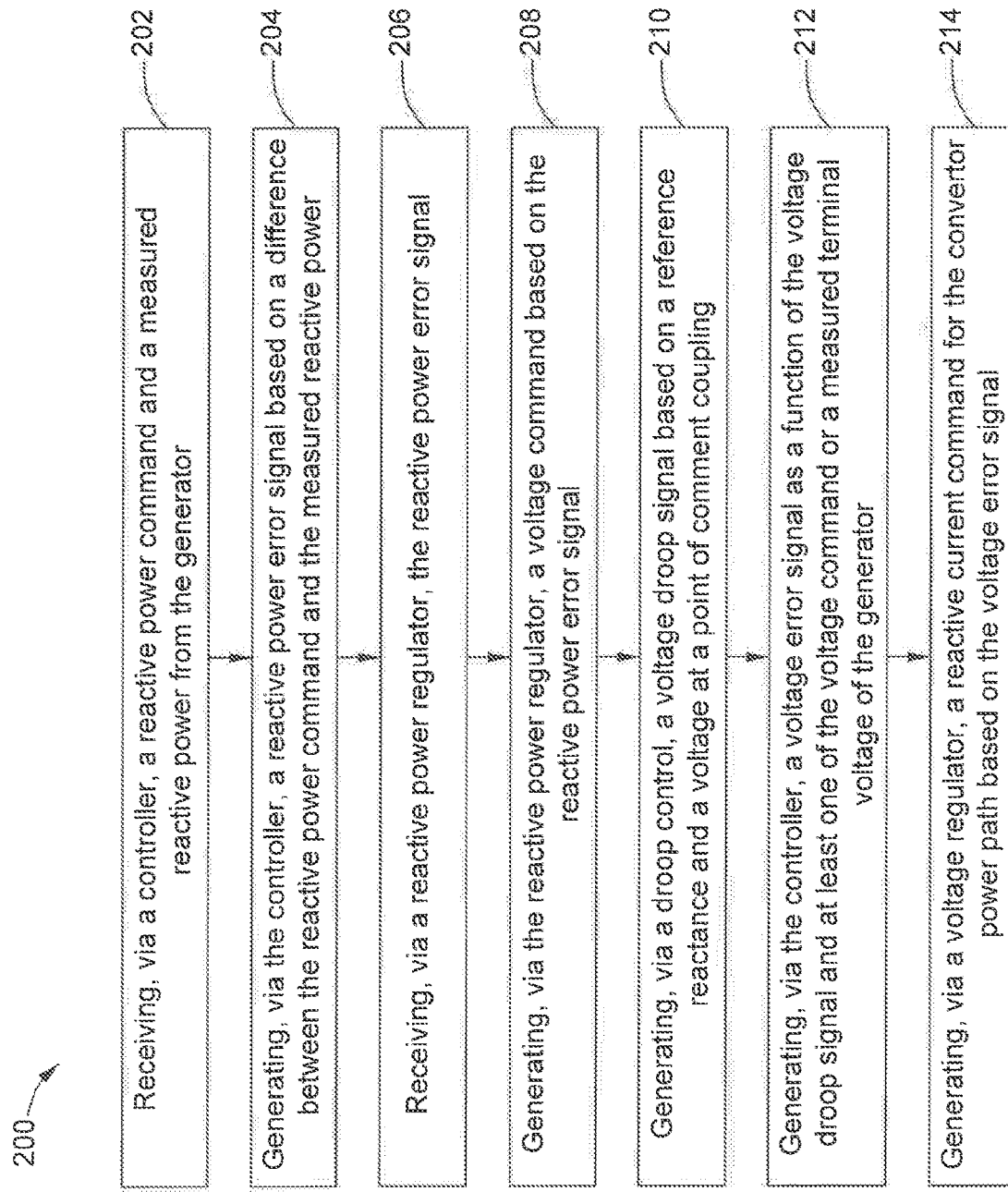
FIG. 8 illustrates a flow chart of one embodiment of a method for controlling a power system connected to a power grid in accordance with the present disclosure.

Referring to FIG. 8, a flow diagram of one embodiment of a method 200 for a power system (as shown in FIG. 5) connected to a power grid is shown in accordance with the present disclosure. As shown at 202, the method 200 includes receiving, by a controller, a reactive power instruction 162 and a measured reactive power 164 ($Q_{g\_fbk}$). As shown at 204, the method 200 includes generating a reactive power error signal 166 by the controller based on the difference between the reactive power instruction 162 and the measured reactive power 164 ($Q_{g\_fbk}$). As shown at 206, method 200 includes receiving a reactive power error signal 166 by a reactive power regulator 168. As shown at 208, the method 200 includes generating a voltage instruction (i.e., voltage instruction 170) by the reactive power regulator 168 based on the reactive power error signal 166.

As shown at 210, the method 200 includes generating a voltage droop signal 188 by a droop controller 186 based on a reference reactance and a voltage at a point of common coupling. As shown at 212, a voltage error signal 176 is generated by the controller based on at least one of a voltage instruction 170 or a measured terminal voltage 174 ($V_{g\_fbk}$) of the generator and the voltage droop signal 188. More specifically, in one embodiment, the controller can generate the voltage error signal 176 using the equation (1) below. For example, as shown, the controller can generate a voltage error signal 176 by: subtracting the measured terminal voltage 174 ($V_{g\_fbk}$) from the voltage instruction 170 ($V_{g\_cmd}$) to obtain a first value; then, the controller can multiply the measured reactive power ($Q_{g\_fbk}$) by the voltage droop signal 188 ($K_{droop}$) to obtain a second value; then, the controller can subtract the second value from the first value to obtain the voltage error signal 176 as shown below.

$$\text{Voltage Error Signal} = (V_{g\_cmd} - V_{g\_fbk} - Q_{g\_fbk} * K_{droop}) \quad \text{equation (1)}$$

As shown at 214, the method 200 includes generating the reactive current instruction 180 ($I_{y\_cmd}$) by a voltage regulator based on the voltage error signal 176. More specifically, the reactive current instruction can be calculated using Equation (2) below.

$$I_{y\_cmd} = (V_{g\_cmd} - V_{g\_fbk} - Q_{g\_fbk} * K_{droop}) * G_{V(s)} \quad \text{equation (2)}$$

wherein, $G_{V(s)}$ is a voltage adjustment value.

In some embodiments, a method is disclosed to simulate a virtual impedance drop by obtaining an appropriate voltage droop signal 188 to maintain the voltage stability of the system and the minimization of reactive power oscillations. The method of obtaining the voltage droop signal 188 is as follows.

In a traditional PMT (or three-winding transformer) topology, the reactive current instruction of a DFIG converter can be expressed as:

$$I_{y\_cmd} = (V_{g\_cmd} - V_{g\_fbk}) * G_{V(s)} \quad \text{equation (3)}$$

The voltage at a point of common coupling (POCC) can be expressed as:

$$V_{pocc} + X_{xy} * I_{y\_fbk} = V_{pocc} + X_{xf} * I_{y\_cmd} = V_{g\_fbk} \quad \text{equation (4)}$$

Combining the equation (4) with the equation (3), the reactive current instruction of the DFIG converter is as follows.

$$I_{y\_cmd} = (V_{g\_cmd} - V_{g\_pocc} - X_{xf} * I_{y\_cmd}) * G_{V(s)} \quad \text{equation (5)}$$

wherein, $X_{xf}$ is the reactance of the PMT.

In the PMT-free topology, see FIGS. 7 and 8, because there is no leakage impedance of the PMT in the system, the reactive current instruction can be calculated using equation (2). Combining the equation (5) with the equation (2), the voltage droop signal 188 can be derived by the equation (6):

$$I_{y\_cmd} = (V_{g\_cmd} - V_{g\_pocc} - X_{xf} * I_{y\_cmd}) * G_{V(s)} \quad \text{equation (6)}$$

In some embodiments, in a PMT-free topology, the voltage at the point of common coupling ($V_{g\_pocc}$) is substantially equal to the measured terminal voltage ($V_{g\_fbk}$) of the generator. The voltage droop signal 188 can be calculated using equation (7) below. The voltage droop signal 188 ($K_{droop}$) is obtained by the reference reactance ($X_{xf}$) and the voltage at the point of common coupling ($V_{g\_pocc}$), where the reference reactance can be the reactance of a virtual pedestal mounted transformer (PMT) used in conventional power systems. In this embodiment, the voltage droop signal 188 ($K_{droop}$) is obtained by dividing the reactance of the virtual pad mounted transformer ($X_{xf}$) by the voltage at the point of common coupling ($V_{g\_pocc}$).

$$K_{droop} = \frac{X_{xf}}{V_{g\_pocc}} \quad \text{equation (7)}$$

In some embodiments, the predetermined range of the limiter 172 (shown in FIG. 7) is generated according to the voltage droop signal 188 ($K_{droop}$). More specifically, generating the predetermined range according to the voltage droop signal 188 ($K_{droop}$) comprises: adding the voltage droop signal 188 to the maximum value of the original voltage range to obtain the maximum value of the predetermined range; and subtracting the voltage droop signal 188 from the minimum value of the original voltage range to obtain the minimum value of the predetermined range.

Figure 9:
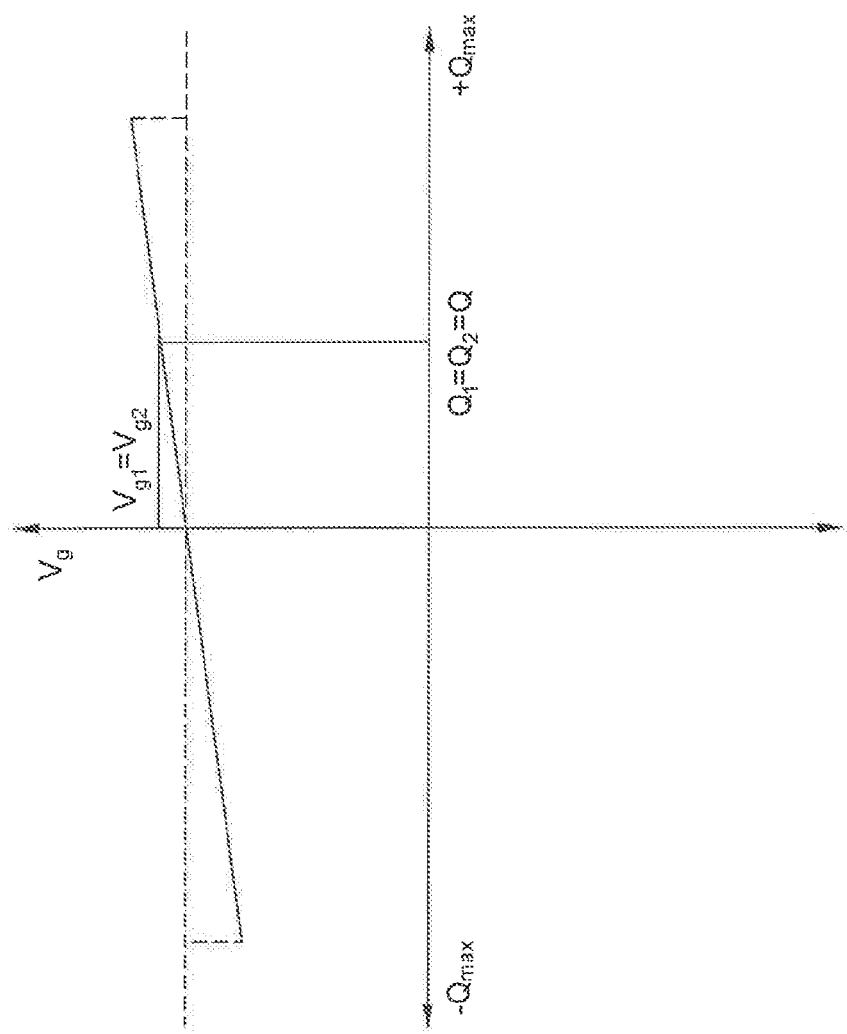
FIG. 9 illustrates a relationship diagram of the voltage vs. reactive power for two wind turbines having same reactive power set points in accordance with the present disclosure.

FIG. 9 illustrates a relationship diagram of the voltage vs. the reactive power for two wind turbines having the same reactive power set points in accordance with the present disclosure. The set points of the voltage regulators on the two wind turbines are the same at the sampling operating point, and the reactive power instructions $Q_1$, $Q_2$ and the voltage instructions $V_{g1}$, $V_{g2}$ of the two generators are also substantially the same, so the droop control may not be activated. However, FIG. 10 illustrates a relationship diagram of the voltage vs. the power for two wind turbines having different reactive power set points in accordance with the present disclosure. When the reactive power instructions $Q_{1'}$, $Q_{2'}$ are different, a correction factor 188 ($V_{virt}$) based on the measured reactive power 164 ($Q_{g\_fbk}$) and the voltage droop signal ($K_{droop}$) is added to modify the voltage instructions 170 of the two wind turbines, keeping the two wind turbines at the same measured terminal voltage $V_g$.

This written description uses examples including the best mode to disclose the invention, and also to enable any person skilled in the art to practice the invention, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a power system connected to a power grid, the power system having a plurality of power subsystem clusters, each of the power subsystems including a generator and defining a stator power path and a converter power path for supplying power to the power grid, the converter power path having a partial power transformer and a rotor power path, the method comprising:
  receiving, by a controller, a reactive power instruction and a measured reactive power from the generator;
  generating a reactive power error signal by the controller based on a difference between the reactive power instruction and the measured reactive power;
  receiving the reactive power error signal by a reactive power regulator;
  generating a voltage instruction by the reactive power regulator based on the reactive power error signal;
  generating a voltage droop signal by a droop controller based on a reference reactance and a voltage at a point of common coupling;
  generating, by the controller, the voltage error signal according to at least one of the voltage instruction or a measured terminal voltage of the generator and a voltage droop signal;
  generating a reactive current instruction for the converter power path by the voltage regulator based on the voltage error signal;
  generating a predetermined range according to the voltage droop signal, wherein the predetermined range is used for limiting the voltage instruction; and
  wherein generating the predetermined range according to the voltage droop signal comprises:
  adding the voltage droop signal to a maximum value of an original voltage range to obtain a maximum value of the predetermined range; and
  subtracting the voltage droop signal from a minimum value of an original voltage range to obtain a minimum value of the predetermined range.

2. The method of claim 1, wherein the reference reactance is a reactance of a pedestal mounted transformer.

3. The method of claim 1, wherein the voltage at the point of common coupling is substantially equal to the measured terminal voltage of the generator.

4. The method of claim 1, further comprising: generating a reactive voltage instruction of the converter power path by the controller based on the reactive current instruction.

5. The method of claim 4, further comprising: converting AC power from the generator to reactive DC power by a switching element of the rotor power path based on the reactive voltage instruction.

6. The method of claim 1, wherein one of the reactive power regulator and the voltage regulator comprises at least one of a proportional integral (PI) controller, a proportional differential (PD) controller, a proportional integral differential (PID) controller, and a state space controller.

7. The method of claim 1, wherein the generator of each of the power subsystems comprises a doubly-fed induction generator (DFIG).

8. A method for controlling a power system connected to a power grid, the power system having a plurality of power subsystem clusters, each of the power subsystems including a generator and defining a stator power path and a converter power path for supplying power to the power grid, the converter power path having a partial power transformer and a rotor power path, the method comprising:
  receiving, by a controller, a reactive power instruction and a measured reactive power from the generator;
  generating a reactive power error signal by the controller based on a difference between the reactive power instruction and the measured reactive power;
  receiving the reactive power error signal by a reactive power regulator;
  generating a voltage instruction by the reactive power regulator based on the reactive power error signal;
  generating a voltage droop signal by a droop controller based on a reference reactance and a voltage at a point of common coupling;
  generating, by the controller, the voltage error signal according to at least one of the voltage instruction or a measured terminal voltage of the generator and a voltage droop signal;
  generating a reactive current instruction for the converter power path by the voltage regulator based on the voltage error signal;
  wherein the voltage error signal generated by the controller according to at least one of the voltage instruction or the measured terminal voltage of the generator and the voltage droop signal, comprises:
  subtracting the measured terminal voltage from the voltage instruction to obtain a first value;
  multiplying the measured reactive power by the voltage droop signal to obtain a second value; and
  subtracting the second value from the first value to obtain the voltage error signal.

9. A control system for a power system connected to a power grid, the power system having a plurality of power subsystem clusters, each of the power subsystems including a generator and defining a stator power path and a converter power path for supplying power to the power grid, the converter power path having a partial power transformer and a rotor power path, the control system comprising:
  one or more sensors for generating at least one of measured reactive power or measured terminal voltage from the generator;
  a controller configured to receive a reactive power instruction and the measured reactive power from the generator, and generate a reactive power error signal based on a difference between the reactive power instruction and the measured reactive power;
  a reactive power regulator configured to receive the reactive power error signal and generates a voltage instruction based on the reactive power error signal;
  a droop controller configured to generate a voltage droop signal based on a reference reactance and a voltage at a point of common coupling;
  the controller is further configured to generate a voltage error signal according to at least one of the voltage instruction or the measured terminal voltage of the generator and the voltage droop signal;
  a voltage regulator configured to generate a reactive current instruction based on the voltage error signal; and
  a limiter configured to generate a predetermined range generated according to the voltage droop signal, wherein the predetermined range is used for limiting the voltage instruction; and
  wherein the limiter generates the predetermined range according to the voltage drop signal by:
  adding the voltage droop signal to a maximum value of an original voltage range to obtain a maximum value of the predetermined range, and
  subtracting the voltage droop signal from a minimum value of an original voltage range to obtain a minimum value of the predetermined range.

10. The control system of claim 9, wherein the voltage at the point of common coupling is substantially equal to the measured terminal voltage of the generator.

11. The control system of claim 9, wherein the voltage error signal is generated by the controller according to at least one of voltage instruction or measured terminal voltage of the generator and the voltage droop signal by:

subtracting the measured terminal voltage from the voltage instruction to obtain a first value;

multiplying the measured reactive power by the voltage droop signal to obtain a second value; and subtracting the second value from the first value to obtain the voltage error signal.

12. The control system of claim 9, wherein the reactive power regulator comprises at least one of a proportional integral (PI) controller; a proportional differential (PD) controller, a proportional integral differential (PID) controller, or state space controller.

13. The control system of claim 9, wherein the power system comprises a wind farm; wherein the power subsystem comprises a wind turbine power system.

14. A wind farm that includes:

a plurality of wind turbine clusters, each of the wind turbine clusters comprising a plurality of wind turbines, each of the wind turbines having a power converter electrically coupled to a generator having a generator rotor and a generator stator, each of the wind turbines defining a stator power path and a converter power path for supplying power to the power grid, the converter power path including a partial power transformer;

a cluster transformer, connecting each of the wind turbine groups to the power grid; and a plurality of turbine controllers, each of the turbine controllers communicatively coupled to one of the wind turbines, the turbine controller configured to perform one or more operations, the one or more operations comprising:

receiving a reactive power instruction and a measured reactive power from the generator;

generating a reactive power error signal based on a difference between the reactive power instruction and the measured reactive power;

receiving the reactive power error signal;

generating a voltage instruction based on the reactive power error signal;

generating a voltage droop signal based on a reference reactance and a voltage at a point of common coupling;

generating the voltage error signal according to at least one of the voltage instruction or a measured terminal voltage of the generator and the voltage droop signal;

generating a reactive current instruction for the converter power path based on the voltage error signal; and generating a predetermined range according to the voltage droop signal to limit the voltage instruction, comprising:

adding the voltage droop signal to a maximum value of an original voltage range to obtain a maximum value of the predetermined range; and subtracting the voltage droop signal from a minimum value of an original voltage range to obtain a minimum value of the predetermined range.

15. The wind farm of claim 14, wherein generating the voltage error signal according to at least one of voltage instruction or measured terminal voltage of the generator and the voltage droop signal, comprises:

subtracting the measured terminal voltage from the voltage instruction to obtain a first value;

multiplying the measured reactive power by the voltage droop signal to obtain a second value; and subtracting the second value from the first value to obtain the voltage error signal.

\* \* \* \* \*